3,281,367
LIQUID DETERGENT COMPOSITIONS
Thomas Gwilym Jones, Bebington, and David William Stephens, Rock Ferry, England, assignors to Lever Brothers Company, New York, N.Y., a corporation of Maine
No Drawing. Filed Apr. 3, 1961, Ser. No. 99,983
Claims priority, application Great Britain, Apr. 6, 1960, 12,170/60
12 Claims. (Cl. 252—112)

This invention relates to detergent compositions and, more particularly, to abrasive detergent compositions in liquid form.

This application is a continuation-in-part of application Serial No. 33,373, filed June 2, 1960 and now abandoned.

Abrasive detergent compositions in the form of blocks, tablets, dry powders or pastes with a limited amount of water or other liquid are known. They contain a finely-divided water-insoluble abrasive material (hereinafter frequently referred to simply as "abrasive"), together with a proportion of a water-soluble detergent such as soap. When abrasives such as those used in these compositions are suspended in liquid media in quantities insufficient to form a paste they normally settle out rapidly.

It has now been found that effective amounts of abrasive can be incorporated in certain aqueous detergent solutions or suspensions to give substantially stable, pourable compositions. By "substantially stable" is meant that the composition after being stored at room temperature for periods of at least several weeks shows either no separation into layers or that the separation is slight and such that the homogeneous product may be easily reconstituted by gentle shaking.

The present invention provides a substantially stable, pourable suspension of a finely-divided water-insoluble abrasive material in a liquid medium comprising essentially water, an anionic detergent and a non-ionic surface-active agent.

A preferred form of the invention provides pourable liquid products with good detergent, lathering, grease-emulsifying and abrasive properties which are stable with respect to the settling out of the abrasive for long periods.

The preferred form of the invention provides a stable pourable suspension of finely-divided water-insoluble abrasive material in an aqueous liquid medium containing an alkali-metal salt of a phosphoric acid having a molecular weight below 400, an anionic detergent, and a fatty acid alkanolamide.

The liquid medium may itself contain a material in suspension and the term "liquid medium" is used in this specification to denote the whole composition referred to, exclusive only of the abrasive material suspended in it.

The nature and proportions of the ingredients must be so chosen that they form a substantially stable suspension in accordance with the invention. While apparently trivial changes in composition may destroy the stability of a suspension, stable products according to the invention may generally be prepared by following the instructions and guidance given in following paragraphs and in the many specific examples: simple trial will show whether any particular composition forms a table suspension.

The abrasive to be used may be any finely-divided water-insoluble abrasive material normally used in abrasive detergent compositions, such as finely-divided silica, felspar, pumice, keiselguhr, emery or Carborundum. Where the compositions are intended for ordinary abrasive cleansing the particle size should be such as to give effective abrasive action without undue scratching, and any abrasive meeting this requirement can be used to give stable compositions according to the invention. Typical particle sizes with respect to abrasive action of this type are such that substantially the whole of the material passes a sieve with apertures of 104 microns and at least 80% passes a sieve with apertures of 53 microns, and abrasive within this range may be effectively included in the compositions of the invention. For certain purposes, however, such as stripping or roughening paintwork, removing rust from iron surfaces or the like it may be desirable to use coarser abrasive particles and stable suspensions containing abrasive particles of a size up to 0.35 mm. have been successfully prepared. Particles of this size are to be understood as being included within the term "finely-divided."

The amount of abrasive to be incorporated in the compositions of the invention may vary within wide limits, in accordance with the desired properties of the composition; normally any particular liquid medium which has suspending properties will suspend any amount of abrasive. Usually at least about 5%, by weight of the total composition, will be required to give effective abrasive action and amounts of up to 65% may often be satisfactorily incorporated to give a product which is still in the form of a pourable liquid. It is preferred to use from 20% to 50%.

The anionic detergent may be a synthetic anionic detergent or a soap, but is preferably a mixture of these two types.

Various anionic synthetic detergents may be used in the compositions of the invention, such as alkylaryl sulphonates, alkyl sulphates, and acylaminoalkane sulphonates, but it is preferred to use alkylaryl sulphonates. Compositions containing acyl isethionates tend to be unstable and are not recommended, while those containing acylaminoalkane sulphonates and those containing alkyl sulphates tend to be intermediate in stability though many satisfactory compositions can be made using these two types of anionic detergent by suitable choice of the other ingredients and proportions. In the preferred compositions of the invention it is generally desirable to use potassium pyrophosphate as the phosphate component when an acylaminoalkane sulphonate is employed.

In the compositions of the invention, other than the preferred compositions in which an alkali-metal salt of a phosphoric acid having a molecular weight below 400, and a fatty acid alkanolamide are present, the amount of anionic detergent used will generally be from 3 to 15% by weight of the liquid medium. The preferred range is 6 to 12%. In general, not less than 0.8% and not more than 12% by weight of the liquid medium should be soap. Preferred ranges are 1% to 7% when synthetic anionic detergent is also present, and 5% to 12% when soap is the sole anionic detergent component. It is preferred to employ from 1% to 9% of synthetic anionic detergent by weight of the liquid medium.

In the preferred compositions of the invention amounts of anionic synthetic detergent of up to 8%, more particularly 1 to 6%, by weight of the liquid medium may generally be used. However, amounts less than about 3% should not be used when no soap is present in these preferred compositions.

The soap employed may be any soap of a type normally used in detergent compositions, such as a sodium or potassium soap derived from tallow, palm oil or coconut oil. The maximum amount which can be used with success may depend upon its solubility in water and it may be advantageous to use more soluble soaps such as potassium soaps, especially potassium soaps of "soft" oils such as groundnut oil.

In the preferred compositions of the invention generally up to 5%, especially 0.5 to 3%, by weight of the liquid medium, of soap may be used, although the maximum amount allowable to give a satisfactory product may be somewhat less than the higher figures given with the more insoluble soaps. However, not less than about 1.2% should usually be used when no synthetic anionic detergent is present in the composition. The total amount of soap and synthetic anionic detergent when both are present, as is preferred, should generally be between 1% and 10%, particularly between 1.5% and 8%, by weight of the liquid medium. It is preferred that the ratio of syntheic anionic detergent to soap is between 1:1 and 4:1.

Among the non-ionic surface-active agents which may be of use in the compositions of the invention there may be mentioned the condensation products of lower alkylene oxides, for example, ethylene oxide, with alkylphenols, fatty acids, fatty alcohols, and the like. Particularly satisfactory compositions may be prepared using a fatty acid alkanolamide, preferably a mono- or di-ethanolamide but other alkanolamides having similar properties such as the isopropanolamides, the glycerolamides and the tris-(hydroxymethyl)-methylamides may also be effective. It is preferred to use a mono- or diethanolamide of a fatty acid having from 8 to 18 carbon atoms in the molecule, especially the mono- or diethanolamide of lauric acid or a mixture of acids rich in lauric acid such as may be obtained from oils such as palm kernel oil or coconut oil. Lauric diethanolamide has been found to be especially satisfactory. Where a large amount of non-ionic surface-active agent is employed some of it may be present as a dispersion in the liquid medium. This does not adversely affect the properties of the composition. It is preferred to use from 1 to 12% of non-ionic surface-active agent by weight of the liquid medium.

In the preferred compositions of the invention the fatty acid alkanolamide to be used is preferably a mono- or diethanolamide, but other alkanolamides having similar properties, such as the isopropanolamides, the glycerolamides and the tris-(hydroxymethyl)-methylamides may also be effective. It is preferred to use a mono- or diethanolamide of a fatty acid having from 8 to 18 carbon atoms in the molecule, especially lauric acid or a mixture of acids rich in lauric acid such as may be obtained from oils such as palm kernel oil and coconut oil. At least 1%, by weight of the liquid medium, of this component is normally required and up to about 10% may be used if desired. It is preferred to use from 1.5 to 6%. With the higher amounts, some of the alkanolamide may be present as a dispersed phase, rather than in solution in the aqueous phase or phases. This does not adversely affect the properties of the composition.

As the phosphate component in the preferred compositions of the invention there may be used an orthophosphate or a salt of a lower condensed phosphoric acid (the acid having a molecular weight below 400) such as, in particular, a pyrophosphate, tripolyphosphate, trimetaphosphate or a tetrametaphosphate. Salts of the higher condensed phosphoric acids, such as Graham's salt, should not be present in appreciable amounts. It is preferred to use a sodium or potassium pyrophosphate or tripolyphosphate. Sodium tripolyphosphate has been found particularly useful, but potassium pyrophosphate may have advantages in certain formulations. The salt should not, of course, be acidic in view of the presence of soap in the compositions. Thus, for instance, sodium dihydrogen orthophosphate should not be used. The amount of phosphate to be used must usually be not less than about 8% by weight of the liquid medium although in certain particular compositions amounts as low as 2% may be satisfactory. Up to about 45%, preferably not more than 35%, by weight of the liquid medium, can be used. With the higher amounts of phosphate, part of it may be present in suspension rather than in solution, but any phosphate in suspension is stabilised against settling in the same way as the added abrasive.

Substances such as perfumes, colouring agents and germicides may also be incorporated provided that their nature and amount is not such as to destroy the stability of the compositions. Certain soluble inorganic salts such as sodium carbonate, sodium bicarbonate, sodium sulphate and borax may often be incorporated in the compositions of the invention, in amounts of up to as much as about 10%, by weight of the liquid medium, particularly where the amounts of the other ingredients of the liquid medium are relatively low, without destroying their stability. It may, however, be undesirable to attempt to include, in appreciable amounts, other water-soluble compounds, especially those having pronounced hydrotropic properties, such as sodium xylene sulphonate. A co-solvent, such as glycerol, may be present in the liquid medium in amounts comparable to the amounts of anionic and non-ionic materials.

The choice of non-aqueous material and proportions to be used in the liquid medium will be determined, apart from the desirability of having adequate suspending power, by considerations such as the detergent, lathering and grease-emulsifying properties and the viscosity which the final product is intended to process. The viscosity of the compositions of the invention is not simply related to the percentage of non-aqueous material in the liquid medium or to the percentage of abrasive in the composition but is a consequence of the compositions as a whole. Compositions of the invention in the form of creams have been prepared in which the proportions of non-aqueous material were from 8.3 to 23.3% by weight of the liquid medium. If an excessive amount of abrasive is added to the liquid medium, however, the resulting product is no longer pourable but in the form of a paste.

The compositions of the invention may be prepared as follows. The anionic detergent is added to water at about 60° C. and the mixture stirred until the detergent has dissolved. The solution is allowed to cool to about 40° C. when the non-ionic surface-active agent and any co-solvent are added with gentle stirring. The abrasive is then slowly added, again with gentle stirring, until the whole is thoroughly mixed. Any minor adjunct such as perfume may then be incorporated. Throughout this procedure the mixing must be thorough, but of such a character as to avoid undue aeration.

The preferred compositions of the invention may be prepared by the following procedure. The phosphate is added with stirring to twice its weight of water (or less if the finished composition is to contain less than this amount of water) at room temperature, the mixture is warmed to about 60° C. and stirred until a smooth cream free from hard lumps is obtained. The stirring should be as gentle as possible but it has been found that some batches of anhydrous phosphate tend to give difficultly dispersible gritty particles when added in water and vigorous stirring may be necessary to form the desired smooth cream. The cream is then allowed to cool to about 40° C. The anionic detergent component is then dissolved in the remaining water at 60° C. and this solution is allowed to cool to about 40° C. when the fatty acid alkanolamide is added with gentle stirring. Evaporation losses in the phosphate cream and the detergent solution are made up, and the phosphate cream is then added with gentle stirring to the detergent solution. The abrasive is then slowly added again with gentle stirring, until the whole is thoroughly mixed. Any minor ingredients, such as perfume and colouring matter may then be incorporated. Throughout this procedure the mixing must be thorough but it should be of such a character as to avoid undue aeration.

The various ionic constituents of the compositions of the invention may be used in the form of alkali-metal ammonium or substituted ammonium, for eample triethanol ammonium, salts.

The following examples illustrate the invention, the figures in each case being percentages by weight. The fine silica used was of a size such that substantially all of it passed through a sieve with apertures of 104 microns size and at least 80% through a sieve of apertures of 53 microns size.

EXAMPLES 1–3

These examples illustrate compositions in which the anionic component is a mixture of a soap and a synthetic anionic detergent.

Mixtures were prepared by the above method consisting of 30% of fine silica and 70% of a liquid medium having the following composition:

| Example | Sodium dodecylbenzene sulphonate | Potassium groundnut oil soap | Lauric diethanolamide | Water |
|---------|----------------------------------|------------------------------|-----------------------|-------|
| 1       | 7.1                              | 1.7                          | 7.1                   | 84.1  |
| 2       | 1.4                              | 5.7                          | 1.4                   | 91.5  |
| 3       | 7.1                              | 2.3                          | 7.1                   | 83.5  |

These mixtures were readily pourable creams with good detergent properties and were substantially stable during storage for four weeks at room temperature.

EXAMPLE 4

This example illustrates a composition in which a co-solvent is employed in an amount comparable to the amounts of the anionic and non-ionic components in the liquid medium.

A composition similar to that of Example 3 except that 4.3% of water was replaced by glycerol, was prepared by the above method. The product had similar properties to those of Example 3.

EXAMPLE 5

This example illustrates a composition in which the anionic component is a mixture of a soap and a synthetic anionic detergent and the non-ionic surface-active component is a mixture of two non-ionic surface-active agents.

A mixture was prepared by the above method consisting of 30% of fine silica and 70% of liquid-medium of the following composition:

Sodium dodecylbenzene sulphonate _____ 5.7
Potassium groundnut oil soap _____ 2.3
Lauric diethanolamide _____ 4.3
Condensation product of p-tertiary octylphenol and 8.5 moles of ethylene oxide _____ 2.9
Water _____ 84.8

The mixture was a readily pourable cream with good detergent properties and was substantially stable during storage for 4 weeks at room temperature.

EXAMPLES 6–8

These examples illustrate compositions in which the anionic component is a mixture of a soap and a synthetic anionic detergent.

Mixtures were prepared by the above method containing 40% of fine silica and 60% of a liquid medium having the following compositions:

| Example | Sodium dodecylbenzene sulphonate | Potassium groundnut oil soap | Lauric diethanolamide | Water |
|---------|----------------------------------|------------------------------|-----------------------|-------|
| 6       | 1.7                              | 6.7                          | 1.7                   | 89.9  |
| 7       | 8.3                              | 6.7                          | 8.3                   | 76.7  |
| 8       | 3.3                              | 2.7                          | 5.0                   | 89.0  |

These mixtures were readily pourable viscous creams with good detergent properties and were substantially stable during storage for 4 weeks at room temperature.

EXAMPLE 9

This example illustrates a composition in which the anionic detergent is a soap.

A mixture was prepared by the above method containing 30% of fine silica and 70% of a liquid medium having the following composition:

Potassium groundnut oil soap _____ 11.4
Lauric diethanolamide _____ 11.4
Water _____ 77.2

The product was a readily pourable viscous cream with good detergent properties and was substantially stable during storage for 4 weeks at room temperature.

EXAMPLE 10

A composition similar to that of Eample 9, except that the lauric diethanolamide was replaced by the condensation product of p-tertiary octylphenol with 8.5 moles of ethylene oxide. This product had similar properties to those of Example 9.

EXAMPLES 11–12

These examples illustrate compositions in which the anionic component is a soap and the non-ionic surface-active component is a mixture of two non-ionic surface-active agents.

A mixture was prepared by the above method containing 30% of fine silica and 70% of a liquid medium having the following composition:

| Example | Potassium groundnut oil soap | Lauric diethanolamide | Condensation product of p-tertiary octylphenol with 8.5 moles of ethylene oxide | Water |
|---------|------------------------------|-----------------------|-----------------------------------------------------------------------------------|-------|
| 11      | 11.4                         | 2.9                   | 8.6                                                                               | 77.1  |
| 12      | 11.4                         | 5.7                   | 5.7                                                                               | 77.2  |

The products had similar properties to those of Examples 6–8.

The following examples illustrate compositions in which the anionic component is a mixture of a soap and a synthetic anionic detergent.

EXAMPLE 13

A mixture was prepared by the above method containing 40% of Carborundum and 60% of a liquid medium of the following composition:

Sodium dodecylbenzene sulphonate _____ 8.3
Potassium groundnut oil soap _____ 6.7
Lauric diethanolamide _____ 8.3
Water _____ 76.7

The mixture was a readily pourable cream substantially stable at room temperature.

EXAMPLE 14

A mixture was prepared by the above method containing 24% of Tripoli powder and 76% of a liquid medium of the following composition:

Sodium dodecylbenzene sulphonate _____ 5.2
Potassium groundnut oil soap _____ 3.4
Lauric diethanolamide _____ 5.2
Water _____ 86.2

The mixture was a readily pourable cream substantially stable at room temperature.

EXAMPLE 15

A mixture was prepared by the above method containing 20% of fine silica and 80% of a liquid medium of the following composition:

Sodium alkyl ($C_{12}$–$C_{14}$) sulphate _____ 1.3
Potassium groundnut oil soap _____ 2.0
Lauric diethanolamide _____ 5.0
Water _____ 91.7

The mixture was a readily pourable cream substantially stable at room temperature.

EXAMPLE 16

A mixture was prepared by the above method containing 30% of fine silica and 70% of a liquid medium of the following composition:

Sodium alkyl ($C_{12}$–$C_{14}$) sulphate _____ 1.4
Potassium groundnut oil soap _____ 2.9
Lauric diethanolamide _____ 7.1
Water _____ 88.6

The mixture was a readily pourable viscous cream substantially stable at room temperature.

The following examples illustrate the preferred compositions of the invention, the amounts of the ingredients in each case being given as percentages by weight. The silica or other abrasive used in Examples 17 to 51 was, in each case, of a fineness such that the whole passed a sieve having apertures of 104 microns.

EXAMPLES 17 TO 19

Mixtures having the following compositions were made by the method given above for the preferred compositions of the invention:

| Ingredients of the liquid medium | Example 17 | Example 18 | Example 19 |
|---|---|---|---|
| Sodium tripolyphosphate | 12.5 | 11.1 | 10.5 |
| Sodium dodecylbenzene sulphonate | 3.8 | 3.3 | 3.2 |
| Potassium groundnut oil soap | 2.0 | 1.3 | 1.3 |
| Lauric diethanolamide | 3.8 | 3.3 | 3.2 |
| Water | to 100 | to 100 | to 100 |
| Fine silica (percentage of the total product) | 20 | 10 | 5 |

All these products formed readily pourable liquids, samples of which were stable for at least two months during storage at room temperature, at 37° C. and at −5° C. They had good cleaning properties on woodwork, painted walls, tiled surfaces, linoleum and sinks.

EXAMPLES 20 AND 21

The following compositions were made up as before:

| Ingredients of the liquid medium | Example 20 | Example 21 |
|---|---|---|
| Sodium tripolyphosphate | 31.6 | 14.3 |
| Sodium dodecylbenzene | 1.9 | 4.3 |
| Potassium groundnut oil soap | 1.3 | 1.7 |
| Lauric diethanolamide | 3.2 | 4.3 |
| Water | to 100 | to 100 |
| Fine silica (percentage of the total product) | 5 | 30 |

These products were viscous but pourable creams, stable on storage.

EXAMPLE 22

A product of the following composition was made up as before:

Ingredients of the liquid medium: Example 22
    Sodium tripoylphosphate _____ 11.1
    Sodium dodecylbenzene sulphonate _____ 3.3
    Potassium groundnut oil soap _____ 1.3
    Lauric diethanolamide _____ 3.3
    Water _____ to 100

Fine felspar (percentage of the total product)_ 10

This product had similar properties to those of Examples 17 to 19.

EXAMPLES 23–24

Compositions similar to that of Example 22 except that the felspar was replaced by fine pumice and kieselguhr.

EXAMPLES 25–28

Products were made containing in each case 25% of fine silica suspended in 75% of a liquid medium having the composition given.

| Ingredients | Example 25 | Example 26 | Example 27 | Example 28 |
|---|---|---|---|---|
| Sodium tripolyphosphate | 11.3 | 11.3 | 13.3 | 13.3 |
| Sodium dodecylbenzene sulphonate | 0 | 4.0 | 5.3 | 2.7 |
| Potassium groundnut oil soap | 1.6 | 0 | 0 | 1.6 |
| Lauric diethanolamide | 2.7 | 2.7 | 2.7 | 2.7 |
| Water | to 100 | to 100 | to 100 | to 100 |

All these products formed stable pourable suspensions.

EXAMPLES 29–35

A liquid medium was made up of the following compositions:

Sodium tripolyphosphate _____ 10
Sodium dodecylbenzene sulphonate _____ 2
Potassium groundnut oil soap _____ 1.2
Lauric diethanolamide _____ 5
Water _____ to 100

In this medium some of the diethanolamide was present as a dispersed phase.

Fine silica was suspended in various amounts in this medium as follows:

| Example | 29 | 30 | 31 | 32 | 33 | 34 | 35 |
|---|---|---|---|---|---|---|---|
| Medium of above composition | 90 | 80 | 70 | 55 | 50 | 40 | 35 |
| Fine silica | 10 | 20 | 30 | 45 | 50 | 60 | 65 |

The products of Examples 29 to 33 formed stable readily pourable mobile liquids at room temperature while the products of Examples 34 and 35 formed stable pourable creams. Products containing more than 65% of fine silica formed nonpourable pastes and do not fall within the ambit of this invention.

The product of Example 32 was considered particularly satisfactory for general use.

EXAMPLES 36–39

A liquid medium was made up of the following composition:

Sodium tripolyphosphate _____ 20
Sodium dodecylbenzene sulphonate _____ 1.8
Potassium groundnut oil soap _____ 1.6
Lauric diethanolamide _____ 3
Water _____ to 100

In this medium some of the phosphate was present in suspended solid form.

Fine silica was suspended in various amounts in this medium as follows:

| Example | 36 | 37 | 38 | 39 |
|---|---|---|---|---|
| Medium of above composition | 70 | 60 | 50 | 40 |
| Fine silica | 30 | 40 | 50 | 60 |

All these products formed stable pourable liquids, the product of Example 39 being in the form of a cream.

EXAMPLES 40–43

Stable pourable liquid products containing in each case 25% of fine silica and 75% of a liquid medium of the given composition:

| Example | 40 | 41 | 42 | 43 |
|---|---|---|---|---|
| Sodium tripolyphosphate | 13.3 | 13.3 | | |
| Sodium pyrophosphate | | | 13.3 | |
| Potassium pyrophosphate | | | | 13.3 |
| Sodium dodecylbenzene sulphonate | | | 4.0 | |
| Sodium lauryl sulphate | 4.0 | | | |
| Sodium oleoylmethyltauride | | 4.0 | | |
| Sodium acylaminoethane sulphonate derived from palm kernel oil fatty acids | | | | 4.0 |
| Potassium groundnut oil soap | | 1.6 | 1.6 | |
| Sodium groundnut oil soap | 1.6 | | | 1.6 |
| Lauric diethanolamide | | | 4.0 | 4.0 |
| Monoethanolamides of coconut oil fatty acids | 4.0 | 4.0 | | |
| Water | (¹) | (¹) | (¹) | (¹) |

¹ To 100 in each case.

EXAMPLE 44

A stable pourable liquid product containing 20% of fine silica and 80% of a liquid medium of the following composition:

| | |
|---|---|
| Trisodium orthophosphate | 12.5 |
| Sodium dodecylbenzene sulphonate | 3.75 |
| Potassium oleate | 2.0 |
| Lauric diethanolamide | 3.75 |
| Water | to 100% |

EXAMPLES 45–49

Stable pourable liquid products containing 40% of fine silica and 60% of a liquid medium of the given composition:

| Example | 45 | 46 | 47 | 48 | 49 |
|---|---|---|---|---|---|
| Sodium tripolyphosphate | 8.35 | 8.35 | 8.35 | 8.35 | 3.3 |
| Sodium pyrophosphate | 8.35 | | | | |
| Sodium carbonate | | 8.35 | | | |
| Sodium sulphate (anhydrous) | | | 8.35 | | |
| Borax (Na₂B₄O₇.10H₂O) | | | | 8.35 | 7.8 |
| Sodium dodecylbenzene sulphonate | 3.3 | 3.3 | 3.3 | 3.3 | 3.3 |
| Potassium groundnut oil soap | 2.7 | 2.7 | 2.7 | 2.7 | 1.8 |
| Lauric diethanolamide | 5.0 | 5.0 | 5.0 | 5.0 | 3.3 |
| Water | (¹) | (¹) | (¹) | (¹) | (¹) |

¹ To 100 in each case.

EXAMPLES 50 AND 51

Stable pourable liquid products containing in each case 35% of fine silica and 65% of a liquid medium containing, by weight of the liquid medium, 15.4% of sodium tripolyphosphate, 3.1% of sodium dodecylbenzene sulphonate, 2.5% of potassium groundnut oil soap and 4.6% of lauric diethanolamide, together with the following germicides and perfumes, and water to 100%:

Example 50                                                    Percent
    p-chloro-m-cresol _____ 2.0
Example 51:
    Bis - (3,5,6 - trichloro - 2-hydroxyphenyl)-methane _____ 0.75
    Pine oil _____ 1.0

EXAMPLE 52

A stable suspension containing 40% of sand passing a 353-micron sieve and retained on a 152-micron sieve and 60% of a liquid medium of the following composition:

| | Percent |
|---|---|
| Sodium tripolyphosphate | 16.7 |
| Sodium dodecylbenzene sulphonate | 3.3 |
| Potassium groundnut oil soap | 2.7 |
| Lauric diethanolamide | 5.0 |
| Water | to 100 |

We claim:
1. A stabilized liquid abrasive detergent composition which consists essentially of, by weight of the total composition, from about 50% to about 95% of an aqueous medium and from about 50% to about 5% of a finely-divided water-insoluble abrasive material having a size smaller than about 350 microns, said aqueous medium consisting essentially of water and, by weight of the total weight of the aqueous medium: from about 3% to about 15% of an anionic detergent selected from the group consisting of sodium and potassium alkylaryl sulfonates, alkyl sulfates, acylaminoalkane sulfonates, and fatty acid soaps derived from tallow, palm oil, coconut oil and groundnut oil; and from about 1% to about 12% of a non-ionic surface-active agent, said finely-divided material being held in stable suspension by the aqueous medium selected from the group consisting of a fatty acid alkanolamide wherein the fatty acid contains from about 8 to about 18 carbon atoms, an alkylphenolethylene oxide condensate, a fatty acid-ethylene oxide condensate and a fatty alcohol-ethylene oxide condensate.

2. A stabilized liquid abrasive detergent composition which consists essentially of, by weight of the total composition, from about 50% to about 95% of an aqueous medium and from about 50% to about 5% of a finely-divided water-insoluble abrasive material having a size smaller than about 350 microns, said aqueous medium consisting essentially of water and, by weight of the total weight of the aqueous medium: from about 1% to about 9% of a synthetic anionic detergent selected from the group consisting of sodium and potassium alkylaryl sulfonates, alkyl sulfates, and acylaminoalkane sulfonates; from about 1% to about 7% of a water-soluble soap selected from the group consisting of the sodium and potassium soaps derived from tallow, palm oil, coconut oil and groundnut oil; and from about 1% to about 12% of a nonionic surface-active agent, said finely-divided material being held in stable suspension by the aqueous medium, selected from the group consisting of a fatty acid alkanolamide wherein the fatty acid contains from about 8 to about 18 carbon atoms, an alkylphenol-ethylene oxide condensate, a fatty acid-ethylene oxide condensate and a fatty alcohol-ethylene oxide condensate.

3. A stabilized liquid abrasive detergent composition which consists essentially of, by weight of the total composition, from about 50% to about 95% of an aqueous medium and from about 50% to about 5% of a finely-divided water-insoluble abrasive material having a size smaller than about 350 microns, said aqueous medium consisting essentially of water and, by weight of the total weight of the aqueous medium: from about 6% to about 12% of an anionic detergent selected from the group consisting of sodium and potassium alkylaryl sulfonates, alkyl sulfates, acylaminoalkane sulfonates, and fatty acid soaps derived from tallow, palm oil, coconut oil and groundnut oil; and from about 1% to about 12% of a non-ionic surface-active agent, said finely-divided material being held in stable suspension by the aqueous medium selected from the group consisting of a fatty acid alkanolamide wherein the fatty acid contains from about 8 to about 18 carbon atoms, an alkylphenol-ethylene oxide condensate, a fatty acid-ethylene oxide condensate and a fatty alcohol-ethylene oxide condensate.

4. A stabilized liquid abrasive detergent composition which consists essentially of, by weight of the total composition, from about 35% to about 95% of an aqueous medium and from about 65% to 5% of a finely-divided water-insoluble abrasive material having a size smaller than about 104 microns, said aqueous medium consisting essentially of water and, by weight of the total weight of the aqueous medium: from about 2% to about 45% of a water-soluble non-acidic salt of a phosphoric acid having a molecular weight below 400; from about 1% to about 10% of a fatty acid alkanolamide selected from the group consisting of the monoethanolamides, diethanolamides, isopropanolamides, glycerolamides and tris-(hydroxymethyl)-methylamides of fatty acids having from about 8 to about 18 carbon atoms in the molecule; from about 3% to about 8% of a water-soluble synthetic organic anionic non-soap detergent selected from the group consisting of sodium and potassium alkylaryl sulfonates, alkyl sulfates, and acylaminoalkane sulfonates; and from about 0% to about 5% of a water-soluble soap selected from the group consisting of the sodium and potassium soaps derived from tallow, palm oil, coconut oil and groundnut oil, said finely-divided material being held in stable suspension by the aqueous medium.

5. A stabilized liquid abrasive detergent composition which consists essentially of, by weight of the total composition, from about 35% to about 95% of an aqueous medium and from about 65% to about 5% of a finely-divided water-insoluble abrasive material having a size smaller than about 104 microns, said aqueous medium consisting essentially of water and, by weight of the total aqueous medium; from about 2% to about 45% of a water-soluble non-acidic salt of a phosphoric acid having a molecular weight below 400; from about 1% to about 10% of a fatty acid alkanolamide selected from the group consisting of the monoethanolamides, diethanolamides, isopropanolamides, glycerolamides and tris-(hydroxymethyl)-methylamides of fatty acids having from about 8 to about 18 carbon atoms in the molecule; from about 0% to about 8% of a water-soluble synthetic organic anionic non-soap detergent selected from the group consisting of sodium and potassium alkylaryl sulfonates, alkyl sulfates, and acylaminoalkane sulfonates; and from about 1.2% to about 5% of a water-soluble soap selected from the group consisting of the sodium and potassium soaps derived from tallow, palm oil, coconut oil and groundnut oil, said finely-divided material being held in stable suspension by the aqueous medium.

6. A stabilized liquid abrasive detergent composition which consists essentially of, by weight of the total composition, from about 35% to about 95% of an aqueous medium and from about 65% to about 5% of a finely-divided water-insoluble abrasive material having a size smaller than about 104 microns, said aqueous medium consisting essentially of water and, by weight of the total aqueous medium: from about 2% to about 45% of a water-soluble non-acidic salt of a phosphoric acid having a molecular weight below 400; from about 1% to about 10% of a fatty acid alkanolamide selected from the group consisting of the monoethanolamides, diethanolamides, isopropanolamides, glycerolamides and tris-(hydroxymethyl)-methylamides of fatty acids having from about 8 to about 18 carbon atoms in the molecule; from about 1% to about 6% of a water-soluble synthetic organic anionic non-soap detergent selected from the group consisting of sodium and potassium alkylaryl sulfonates, alkyl sulfates, and acylaminoalkane sulfonates; and from about 0.5 to about 3% of a water-soluble soap selected from the group consisting of the sodium and potassium soaps derived from tallow, palm oil, coconut oil and groundnut oil, said finely-divided material being held in stable suspension by the aqueous medium.

7. A stabilized liquid abrasive detergent composition which consists essentially of, by weight of the total composition, from about 35% to about 95% of an aqueous medium and from about 65% to about 5% of a finely-divided water-insoluble abrasive material having a size smaller than about 104 microns, said aqueous medium consisting essentially of water and, by weight of the total aqueous medium: from about 8% to about 35% of a water-soluble non-acidic salt of a phosphoric acid having a molecular weight below 400; from about 1% to about 10% of a fatty acid alkanolamide selected from the group consisting of the monoethanolamides, diethanolamides, isopropanolamides, glycerolamides and tris-(hydroxymethyl)-methylamides of fatty acids having from about 8 to about 18 carbon atoms in the molecule; from about 1% to about 6% of a water-soluble synthetic organic anionic non-soap detergent selected from the group consisting of sodium and potassium alkylaryl sulfonates, alkyl sulfates, and acylaminoalkane sulfonates; and from about 0.5% to about 3% of a water-soluble soap selected from the group consisting of the sodium and potassium soaps derived from tallow, palm oil, coconut oil and groundnut oil, said finely-divided material being held in stable suspension by the aqueous medium.

8. A stabilized liquid abrasive detergent composition which consists essentially of, by weight of the total composition, from about 35% to about 95% of an aqueous medium and from about 65% to about 5% of a finely-divided water-insoluble abrasive material having a size smaller than about 104 microns, said aqueous medium consisting essentially of water and, by weight of the total weight of the aqueous medium: from about 8% to about 35% of a water-soluble non-acidic salt of a phosphoric acid having a molecular weight below 400; from about 1.5% to about 6% of a fatty acid alkanolamide selected from the group consisting of the monoethanolamides, diethanolamides, isopropanolamides, glycerolamides and tris-(hydroxymethyl)-methylamides of fatty acids having from about 8 to about 18 carbon atoms in the molecule; and from about 1% to about 10% of a mixture of a water-soluble synthetic organic anionic non-soap detergent selected from the group consisting of sodium and potassium alkylaryl sulfonates, alkyl sulfates, and acylaminoalkane sulfonates and a water-soluble soap selected from the group consisting of the sodium and potassium soaps derived from tallow, palm oil, coconut oil and groundnut oil in a ratio by weight of from 1:1 to 4:1, said finely-divided material being held in stable suspension by the aqueous medium.

9. A stabilized liquid abrasive detergent composition which consists essentially of, by weight of the total composition, from about 50% to about 80% of an aqueous medium and from about 50% to about 20% of a finely-divided water-insoluble abrasive material having a size smaller than about 104 microns, said aqueous medium consisting essentially of water and, by weight of the total weight of the aqueous medium: from about 8% to about 35% of a water-soluble alkali-metal tripolyphosphate; from about 1.5% to about 6% of a water-soluble diethanolamide of a fatty acid having from about 8 to about 18 carbon atoms in the molecule; from about 1% to about 6% of a water-soluble alkali-metal alkylaryl sulfonate containing from about 9 to about 18 aliphatic carbon atoms in the molecule; and from about 0.5% to about 3% of potassium groundnut oil soap, said finely-divided material being held in stable suspension by the aqueous medium.

10. A stabilized liquid abrasive detergent composition which consists essentially of, by weight of the total composition, from about 50% to about 30% of an aqueous medium and from about 20% to about 50% of a finely-divided silica having a size smaller than about 104 microns, said aqueous medium consisting essentially of water and, by weight of the total aqueous medium; from about 8% to about 35% of sodium tripolyphosphate; from about 1.5% to about 6% of lauric diethanolamide; from about 1% to about 6% of sodium dodecylbenzene sulfonate; and from 0.5% to about 3% by weight of potassium groundnut oil soap, said finely-divided material being held in stable suspension by the aqueous medium.

11. A stabilized liquid abrasive detergent composition which consists essentially of, by weight of the total composition, from about 35% to about 95% of an aqueous medium and from about 65% to 5% of a finely-divided water-insoluble abrasive material having a size smaller than about 350 microns, said aqueous medium consisting essentially of water and, by weight of the total weight of the aqueous medium from about 2% to about 45% of a water-soluble non-acidic salt of a phosphoric acid having a molecular weight below 400; from about 1% to about 10% of a fatty acid alkanolamide selected from the group consisting of the monoethanolamides, diethanolamides, isopropanolamides, glycerolamides and tris-(hydroxymethyl)-methylamides of fatty acids having from about 8 to about 18 carbon atoms in the molecule; from about 3% to about 8% of a water-soluble synthetic organic anionic non-soap detergent selected from the group consisting of sodium and potassium alkylaryl sulfonates, alkyl sulfates, and acylaminoalkane sulfonates; and from about 0% to about 5% of a water-soluble soap selected from the group consisting of the sodium and potassium soaps derived from tallow, palm oil, coconut oil and groundnut oil, said finely-divided material being held in stable suspension by the aqueous medium.

12. A stabilized liquid abrasive detergent composition which consists essentially of, by weight of the total composition, from about 35% to about 95% of an aqueous medium and from about 65% to about 5% of a finely-divided water-insoluble abrasive material having a size smaller than about 350 microns, said aqueous medium consisting essentially of water and, by weight of the total weight of the aqueous medium: from about 2% to about 45% of a water-soluble non-acidic salt of a phosphoric acid having a molecular weight below 400; from about 1% to about 10% of a fatty acid alkanolamide selected from the group consisting of the monoethanolamides, diethanolamides, isopropanolamides, glycerolamides and tris-(hydroxymethyl)-methylamides of fatty acids having from about 8 to about 18 carbon atoms in the molecule; from about 0% to about 8% of a water-soluble synthetic organic anionic non-soap detergent selected from the group consisting of sodium and potassium alkylaryl sulfonates, alkyl sulfates, and acylaminoalkane sulfonates; and from about 1.2% to about 5% of a water-soluble soap selected from the group consisting of the sodium and potassium soaps derived from tallow, palm oil, coconut oil and groundnut oil, said finely-divided material being held in stable suspension by the aqueous medium.

References Cited by the Examiner

UNITED STATES PATENTS

| | | | |
|---|---|---|---|
| 2,047,320 | 7/1936 | Ferguson | 252—108 |
| 2,164,810 | 7/1939 | Flaxman | 252—120 |
| 2,892,795 | 6/1959 | Dalton | 252—138 XR |
| 2,920,045 | 1/1960 | Hearn et al. | 252—137 |
| 2,945,815 | 7/1960 | Diaz | 252—138 |

FOREIGN PATENTS 14,401  1904  Great Britain.

LEON D. ROSDOL, *Primary Examiner.*

JULIUS GREENWALD, *Examiner.*

J. T. FEDIGAN, *Assistant Examiner.*